Aug. 19, 1952     S. D. LARK     2,607,273
ADJUSTABLE TWO-SIDED REFLECTING MIRROR FOR MOTOR VEHICLES
Filed Feb. 18, 1949
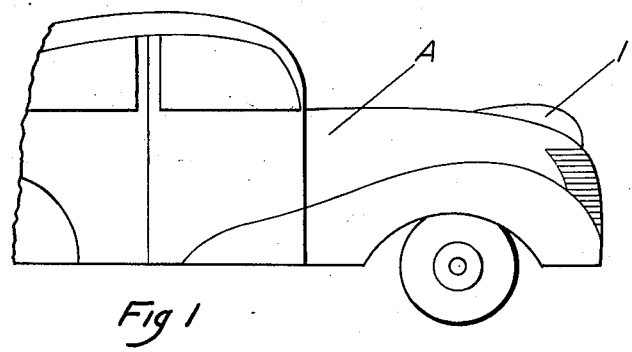
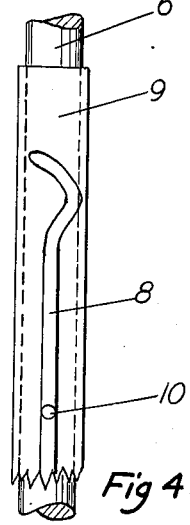
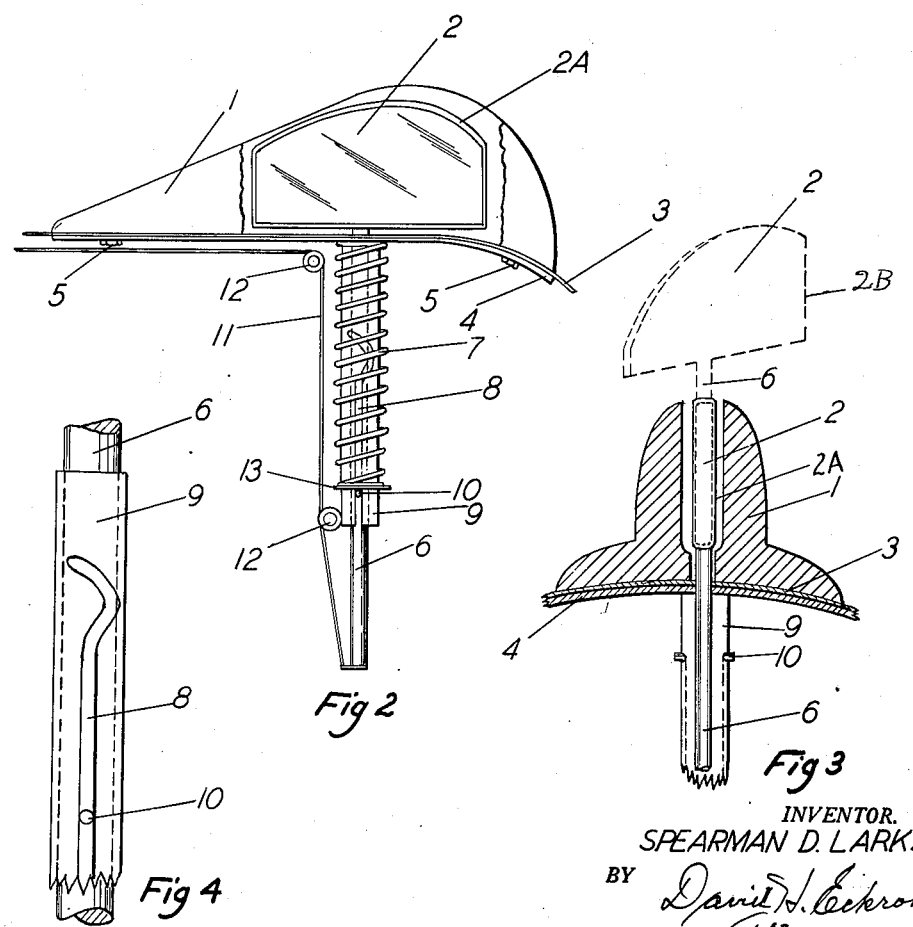
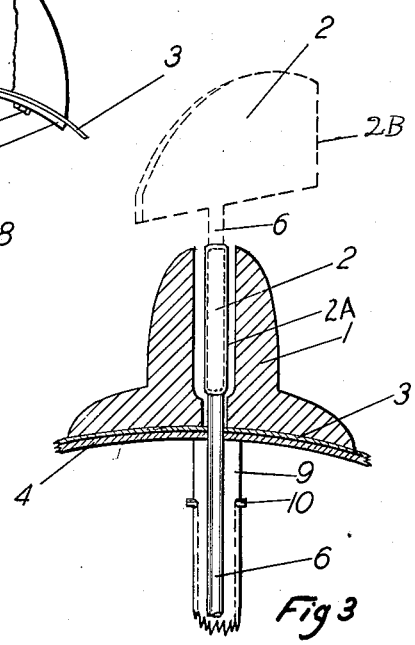
INVENTOR.
SPEARMAN D. LARK.

Patented Aug. 19, 1952

2,607,273

UNITED STATES PATENT OFFICE 2,607,273

ADJUSTABLE TWO-SIDED REFLECTING MIRROR FOR MOTOR VEHICLES

Spearman D. Lark, Cleveland, Ohio

Application February 18, 1949, Serial No. 77,195

3 Claims. (Cl. 88—98)

My invention relates to a new design and improvement in a reflecting mirror for use on motor vehicles.

The principal object of this invention is to provide a device in the form of a two-sided mirror for installing on or beneath the front part of hood, or hood ornament, on an automobile with a means for causing such mirror to rise from underneath the hood, or out of such hood ornament, in a position so that the driver of the car may be able to see objects to the left, or right of such car by merely looking at such mirror Another object of the invention is to provide a mirror of the class described that is concealed and disappears when not in use.

Another object of the invention, or device, is to provide a mirror of the class described that is raised or lowered into a hood ornament, or a hood on an automobile, at the desire of a driver of such automobile by means attached to the dash board of such automobile.

A further object of the invention is to provide a device of the character described, adapted to be installed on the front portion of the hood of an automobile, or immediately to the rear of the usual hood ornament, with means to cause such mirror to disappear within such hood at the will of the driver of such automobile.

A further object of the invention is to provide a device of the character described that is adapted to be either built in with an automobile or attached on an automobile, in the manner described, as an accessory.

Other objects and uses of this invention will become apparent from a reading of the description and a reference to the accompanying drawing, in which:

Fig. 1 is a sectional view of an automobile with a hood ornament for installing the invention within same.

Fig. 2 is a view in elevation of the complete device with the mirror concealed within the hood ornament.

Fig. 3 is a cross-sectional front view of the device installed within a hood ornament and the mirror indicated in its service position.

Fig. 4 is a sectional view of the slotted tube and the rod connected to the mirror.

Referring to the numerals and parts shown and set forth in the drawing: A is an automobile and I is a hood ornament with an aperture lengthwise in which the mirror 2 is disposed, 2 is a two-sided mirror or mirror-like object with frame 2A, 2B refers to the position of the mirror 2 in its forced-up position for use in reflecting objects to the left and rear of such automobile, either to the right or left, 3 is the base of the ornament I affixed to the bonnet 4 of an automobile, 5 is a means for attaching the ornament I to the bonnet 4, 6 is the rod to which the mirror 2 is fixed and made integral with same which is disposed within the slotted tube 9, the tube 9 having longitudinal curved slots in its surface and 6 having a pin 10 which engages such slots 8. The slots 8 being in the form shown so that when the mirror is forced upward out of the ornament I the pin 10 engaging such slots causes the mirror 2 to turn at an angle to the hood and in position so that objects to the rear and left of such automobile will be reflected in the mirror, 11 is a small rope or cable attached to the lower extremity of the rod 6 to a washer 13 and passes over the pulleys 12 to the dash-board of the car within convenient reach of the driver, 13 is a disk-washer attached to base of the coil spring 7. When the mirror is forced upward out of I the spring 7 becomes compressed by a pull on 11 and when the pull on 11 ceases such spring will withdraw the raised mirror 2 from its position shown by 2B, down into an aperture in the ornament I to the position shown in Fig. 2.

The device may also be adapted to be installed on the hood of an automobile immediately adjacent to the hood ornament or on the front portion of such hood, in the form of an accessory.

From the foregoing description of parts it will be readily discerned that the device comprises a two-sided mirror, or a mirror-like object, which fits into an aperture in the ornament I, such mirror is fixed on a vertical rod extending downward on the inside of the hood of an automobile through a tube having curved slots lengthwise of its sides and a coil or expansion spring coiled around its outside surface and provided with a disk washer at its lower extremity. The mirror rod has a small pin extending transversely through its lower portion and extending beyond its surface to engage in the slots 8 in the sides of the tube and on the under surface of the disk-washer 13, a small cable or cord is attached to the lower end of the mirror tube and passes over pulleys to a convenient position on the dash-board of an automobile.

When the mirror is not in use it is concealed within the aperture in the ornament I and when the driver desires to use such mirror he pulls on the cable 11 which causes the mirror to be forced upward out of the aperture in the ornament I. As the mirror is forced upward, the pin in its attached rod 6 engages the slots on either side of the tube 9 and causes the mirror to turn slightly to the left permitting the driver, in the case of a parked car, to see any vehicle, or vehicles approaching from such left rear side without first heading his car into the throughfare, likewise in passing cars from the rear the mirror will serve a like purpose. By using a stronger pull on the cord, or cable 11 the mirror will turn back and slightly to the right thus permitting the driver to view objects in the rear on such side. As soon as the pull on the cord or cable is released, the coil spring automatically returns the mirror to its downward or concealed position within the ornament 1.

The mirror may be of glass or any suitable material having reflecting surfaces.

I have shown my invention in a desired form and structure, however, adaptations in its use may require modifications in form or structure or both, without departing from the basic features or spirit of the invention.

Having described my invention, I now claim:

1. A device of the character described in combination with a motor vehicle and the hood of same comprising a double sided mirror attached to the upper portion of a vertical rod, said rod adapted to be moved vertically within an inclosing tube, said tube having longitudinal curved slots in its walls, said rod affixed with a transverse pin at its lower extremity, said pin adapted to engage said slots, a spiral coil expansion spring disposed and positioned about the exterior surface of said tube, said spring affixed with a disk-washer at its lower extremity, a flexible means attached to the lower extremity of said rod and extending to the instrument panel of said motor vehicle through a system of supporting pulleys secured from said hood and within the motor vehicle between the said instrument panel and said rod, said mirror to be thrust into an exposed service position out of the concealing aperture by exerting a manual pulling force on said flexible means.

2. A device as described in claim 1 in combination with a motor vehicle and the hood of same, said mirror receding and disappearing into the said aperture located in said hood ornament of said motor vehicle, by reason of the release of the said manual pulling force on said flexible means allowing return of said spiral spring to return to its normal position from the said compressed position existing during the exertion of the said manual pulling force on the said flexible means.

3. A device as described in claim 2 in combination with a motor vehicle and the hood of same, said mirror rotating in a counter-clockwise direction from its normal position facing partly towards the left side of the said motor vehicle by reason of continuing and increased manual pull exerted on the said flexible means, and said mirror returning to its concealed position within the said aperture in the hood ornament when the said manual pulling force on the said flexible means is relaxed and discontinued.

SPEARMAN D. LARK.

REFERENCES CITED

The following references are of record in the file of this patent:

UNITED STATES PATENTS

| Number | Name | Date |
|---|---|---|
| 2,472,438 | Price | June 7, 1949 |

FOREIGN PATENTS

| Number | Country | Date |
|---|---|---|
| 134,571 | Great Britain | Nov. 13, 1919 |
| 490,311 | Great Britain | Aug. 12, 1938 |